United States Patent
Kikuchi et al.

(10) Patent No.: US 7,232,582 B2
(45) Date of Patent: * Jun. 19, 2007

(54) FUEL CELL

(75) Inventors: Hideaki Kikuchi, Kawachi-gun (JP);
Naoyuki Enjoji, Utsunomiya (JP);
Masaharu Suzuki, Utsunomiya (JP);
Masaru Oda, Utsunomiya (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 449 days.

This patent is subject to a terminal disclaimer.

(21) Appl. No.: 10/374,280

(22) Filed: Feb. 26, 2003

(65) Prior Publication Data

US 2003/0162078 A1 Aug. 28, 2003

(30) Foreign Application Priority Data

Feb. 26, 2002 (JP) ............................. 2002-050193

(51) Int. Cl.
*H01M 8/02* (2006.01)
*H01M 8/10* (2006.01)
*H01M 8/24* (2006.01)

(52) U.S. Cl. ............................. 426/38; 429/26; 429/30
(58) Field of Classification Search ................. None
See application file for complete search history.

(56) References Cited

U.S. PATENT DOCUMENTS

| 5,776,624 | A | * | 7/1998 | Neutzler ...................... 429/26 |
| 6,261,710 | B1 | * | 7/2001 | Marianowski ............... 429/34 |
| 7,022,430 | B2 | * | 4/2006 | Enjoji et al. ................. 429/39 |
| 2001/0008719 | A1 | * | 7/2001 | Ikeda ......................... 429/12 |

* cited by examiner

*Primary Examiner*—Dah-Wei Yuan
*Assistant Examiner*—Robert Hodge
(74) *Attorney, Agent, or Firm*—Lahive & Cockfield, LLP; Anthony A. Laurentano, Esq.

(57) ABSTRACT

First and second separators include first and second metal plates. The first metal plate has first embossed protrusions protruding toward a membrane electrode assembly to form an oxygen-containing gas flow passage. The second metal plate has second embossed protrusions protruding toward another membrane electrode assembly to form a fuel gas flow passage. Further, the second metal plate has third small embossed protrusions protruding toward the first metal plate.

7 Claims, 7 Drawing Sheets

FUEL CELL

BACKGROUND OF THE INVENTION

1. Field of the Invention

The present invention relates to a fuel cell including an electrolyte electrode assembly and a pair of separators. The electrolyte electrode assembly includes an anode, a cathode, and an electrolyte interposed between the anode and the cathode. The electrolyte electrode assembly is interposed between the separators.

2. Description of the Related Art

For example, a solid polymer electrolyte fuel cell employs a membrane electrode assembly (MEA) which comprises two electrodes (anode and cathode) and an electrolyte membrane interposed between the electrodes. The electrolyte membrane is a polymer ion exchange membrane (proton exchange membrane). Each of the electrodes comprises a catalyst and a porous carbon sheet. The membrane electrode assembly is interposed between separators (bipolar plates). The membrane electrode assembly and the separators make up a unit of the fuel cell (unit cell) for generating electricity. A plurality of unit cells are connected together to form a fuel cell stack.

In the fuel cell of the fuel cell stack, a fuel gas such as a hydrogen-containing gas is supplied to the anode. The catalyst of the anode induces a chemical reaction of the fuel gas to split the hydrogen molecule into hydrogen ions (protons) and electrons. The hydrogen ions move toward the cathode through the electrolyte, and the electrons flow through an external circuit to the cathode, creating a DC electric current. An oxygen-containing gas or air is supplied to the cathode. At the cathode, the hydrogen ions from the anode combine with the electrons and oxygen to produce water.

Figure 7:
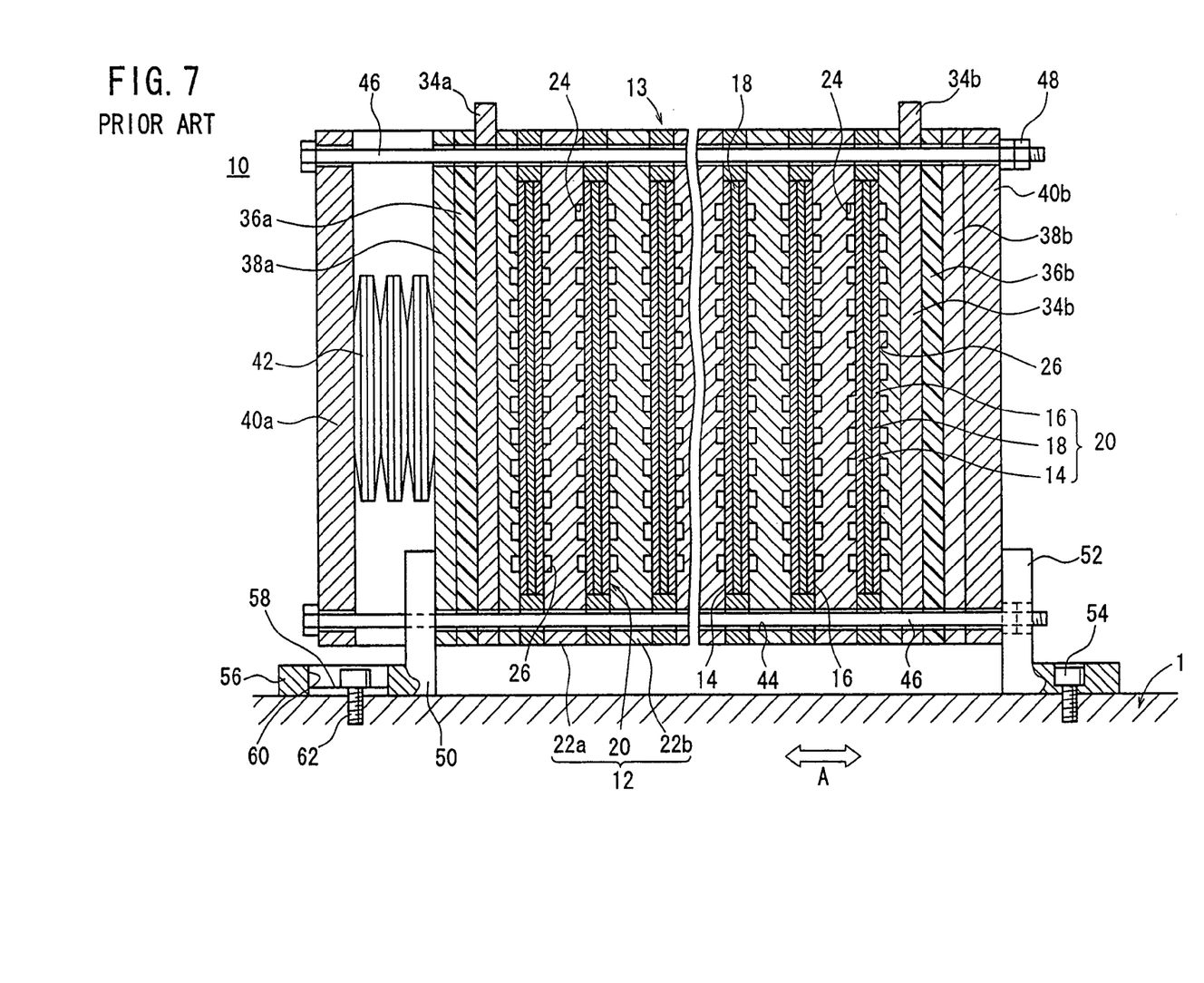
FIG. 7 is a cross sectional view showing a part of a conventional fuel cell stack.

For example, as shown in FIG. 7, a fuel cell stack 10 is mounted on a base 1 such as a vehicle body of a vehicle. In the fuel cell stack 10, a plurality of unit cells (fuel cells 12) are connected together in series, and stacked horizontally (in a direction indicated by an arrow A) to form a stack body 13.

The unit cell 12 includes a membrane electrode assembly 20 and separators 22a, 22b. The membrane electrode assembly 20 includes an anode 14, and a cathode 16, and an electrolyte membrane 18 interposed between the anode 14 and the cathode 16. The membrane electrode assembly 20 is interposed between the separators 22a, 22b. Each of the separators 22a, 22b has a first reactant gas flow passage 24 on its surface facing the anode 14, and a second reactant gas flow passage 26 on its surface facing the cathode 16. A fuel gas such as a hydrogen-containing gas is supplied to or discharged from the anode 14 through the first reactant gas flow passage 24. An oxygen-containing gas such as air is supplied to or discharged from the cathode 16 through the second reactant gas flow passage 26.

Terminal plates 34a, 34b are electrically connected to the outermost unit cells 12 disposed at opposite ends of the stack body 13 in the stacking direction, respectively. Insulator plates 36a, 36b for prevention of electric leakage are stacked on the outside of the terminal plates 34a, 34b, respectively. End plates 38a, 38b are stacked on the outside of insulator plates 36a, 36b, respectively. Further, back up plates 40a, 40b are disposed outside the end plates 38a, 38b, respectively. The unit cells 12, the terminal plates 34a, 34b, the insulator plates 36a, 36b, end plates 38a, 38b, and back up plates 40a, 40b make up the fuel cell stack 10.

A plurality of spring members 42 such as belleville springs are interposed between the end plate 38a and the back up plate 40a for maintaining electrical connections between the adjacent unit cells 12.

In the peripheral area of the fuel cell stack 10, a plurality of through holes 44 are formed. The through holes 44 extend from the back up plate 40a to the other back up plate 40b. Tie rods 46 are inserted into the through holes 44, respectively. Nuts 48 are threaded over the tie rods 46 to tighten the back up plates 40a, 40b. Therefore, the stack body 13, the terminal plates 34a, 34b, and the end plates 38a, 38b are pressed together, and the belleville springs 42 are compressed.

The fuel cell stack 10 is mounted on the base 1 using brackets 50, 52. The brackets 50, 52 are connected to the end plate 38a, the back up plate 40b, respectively. The bracket 52 is fixed to the base 1 by a bolt 54. The bracket 50 is slidable on the base 1.

An arm 56 extends from a lower end of the bracket 50. An oblong groove 60 having a step 58 is formed in the arm 56. A bolt 62 is inserted in the oblong groove 60. The step 58 is pressed by a head of the bolt 52 with a suitable force. In this manner, the bracket 50 is slidably mounted on the base 1.

When the stack body 13 is thermally expanded in the stacking direction during the operation of the fuel cell stack 10, the belleville springs 42 are compressed to some extent corresponding to the amount of thermal expansion. When the operation of the fuel cell stack 10 is stopped, and the temperature of the fuel cell stack 10 is lowered, the stack body 13 is thermally contracted. Therefore, the belleville springs 42 are stretched. The thermal expansion or contraction of the stack body 13 causes the belleville springs 42 to be compressed or stretched. Therefore, the tightening force applied to the stack body 13 is maintained substantially.

The electrolyte membrane 18 absorbs and releases water produced in the electrochemical reaction. Further, the electrolyte membrane 18 absorbs and releases moisture in the fuel gas and the oxygen-containing gas. Therefore, the electrolyte membrane 18 swells and shrinks in the stacking direction of the stack body 13. Further, the membrane electrode assembly 20 wears out with thermal changes in the repeated use of the fuel cell stack 10. Therefore, the rigidity of the membrane electrode assembly 20 is reduced, and the size of the membrane electrode assembly 20 is reduced slightly. The size reduction also occurs in a sealing member (not shown) for supporting the membrane electrode assembly 20, and the separators 22a, 22b.

In the fuel cell stack 10, when the dimension of the components such as the electrolyte membrane 18, the sealing member, the separators 22a, 22b changes in the stacking direction, the belleville springs 42 are compressed or stretched correspondingly. Therefore, the stack body 13 is constantly pressed together under a desirable pressure.

In the fuel cell stack 10, when the dimension of the components such as the electrolyte membrane 18, the sealing member, the separators 22a, 22b changes in the stacking direction, the belleville springs 42 are compressed or stretched correspondingly. Therefore, the stack body 13 is constantly pressed together under a desirable pressure.

When the dimension of the components changes in the fuel cell unit 10, and the belleville springs 42 are compressed or stretched, the bracket 50 guided by the oblong groove 60 and the bolt 62 slides on the base 1 in the stacking direction.

In the fuel cell stack 10, the bracket 50 is slidably mounted on the base 1. Therefore, a relatively large space is needed for installing the fuel cell stack 10. Normally, the separators are made of carbon, and relatively thick to have a necessary strength. A plurality of the belleville springs 42 are interposed between the end plate 38 and the back up plate 40a. The fuel cell 10 has a relatively large dimension due to the belleville springs 42. Therefore, the overall fuel cell stack 10 is relatively large and heavy.

SUMMARY OF THE INVENTION

A main object of the present invention is to provide a compact and light fuel cell having thin separators without using any belleville springs.

According to the present invention, an electrolyte electrode assembly is interposed between separators. At least one of the separators has at least a first and second metal plates. The first metal plate has first protrusions protruding toward the electrolyte electrode assembly (first electrolyte electrode assembly). The first protrusions may be embossed protrusions, for example. The first protrusions form a reactant gas flow passage between the first electrolyte electrode assembly and the first metal plate.

Further, the second metal plate has second protrusions provided in alignment with the first protrusions. The second protrusions protrude oppositely to the first protrusions toward another electrolyte electrode assembly (second electrolyte electrode assembly). The second protrusions may be embossed protrusions, for example. The second protrusions form another reactant gas flow passage between the second electrolyte electrode assembly and the second metal plate. Further, the second metal plate has third protrusions in contact with flat part of the first metal plate. The third protrusions protrude oppositely to the second protrusions. The third protrusions may be embossed protrusions, for example.

As described above, the first and second metal plates have the first and second protrusions in contact with the electrolyte electrode assemblies. Therefore, the flat part of the first metal plate and the flat part of the second metal plate are spaced from the electrolyte membrane assemblies. The third protrusions of the second metal plate are in contact with the flat part of the first metal plate. Therefore, a spring mechanism is formed by the flat part of the first metal plate, the flat part of the second metal plate, and the third protrusions.

The spring mechanism maintains the tightening force for tightening the entire fuel cell stack substantially uniformly. Therefore, it is not necessary to use any belleville springs at an end of the fuel cell stack in the stacking direction. Further, it is not necessary to use any dedicated leaf springs or the like in the fuel cell stack. Since the metal plates are used as the separators, the separators are thin in contrast to the conventional separators made of carbon. Therefore, the overall fuel cell is compact and light.

The first metal plate and the second metal plate are stacked together. A coolant flow passage is formed between the first metal plate and the second metal plate if necessary. The first metal plate is provided on one surface of the first electrolyte electrode assembly and the second metal plate is provided on the other surface of the second electrolyte electrode assembly. The first protrusions form one of the reactant gas flow passages between the first metal plate and the first electrolyte electrode assembly, and the second protrusions form the other reactant gas flow passage between the second metal plate and the second electrolyte electrode assembly.

As described above, the first metal plates, the second metal plates, and the electrolyte electrode assemblies are stacked together. Specifically, a unit cell is formed by interposing the electrolyte electrode assembly between the first metal plate and the second metal plate. A plurality of the unit cells are stacked together to form a fuel cell stack.

One of the reactant gas flow passages is an oxygen-containing gas flow passage for supplying an oxygen-containing gas to a cathode, and the other of the reactant gas flow passages is a fuel gas flow passage for supplying a fuel gas to an anode. The third protrusions of the second metal plate protrude from the fuel gas flow passage to the first metal plate.

The third protrusions form recesses in the fuel gas flow passage. However, the third protrusions do not form recesses in the oxygen-containing gas flow passage. Therefore, water produced by the electrochemical reactions is not kept in the oxygen-containing gas flow passage, and the water is smoothly discharged from the oxygen-containing gas flow passage.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
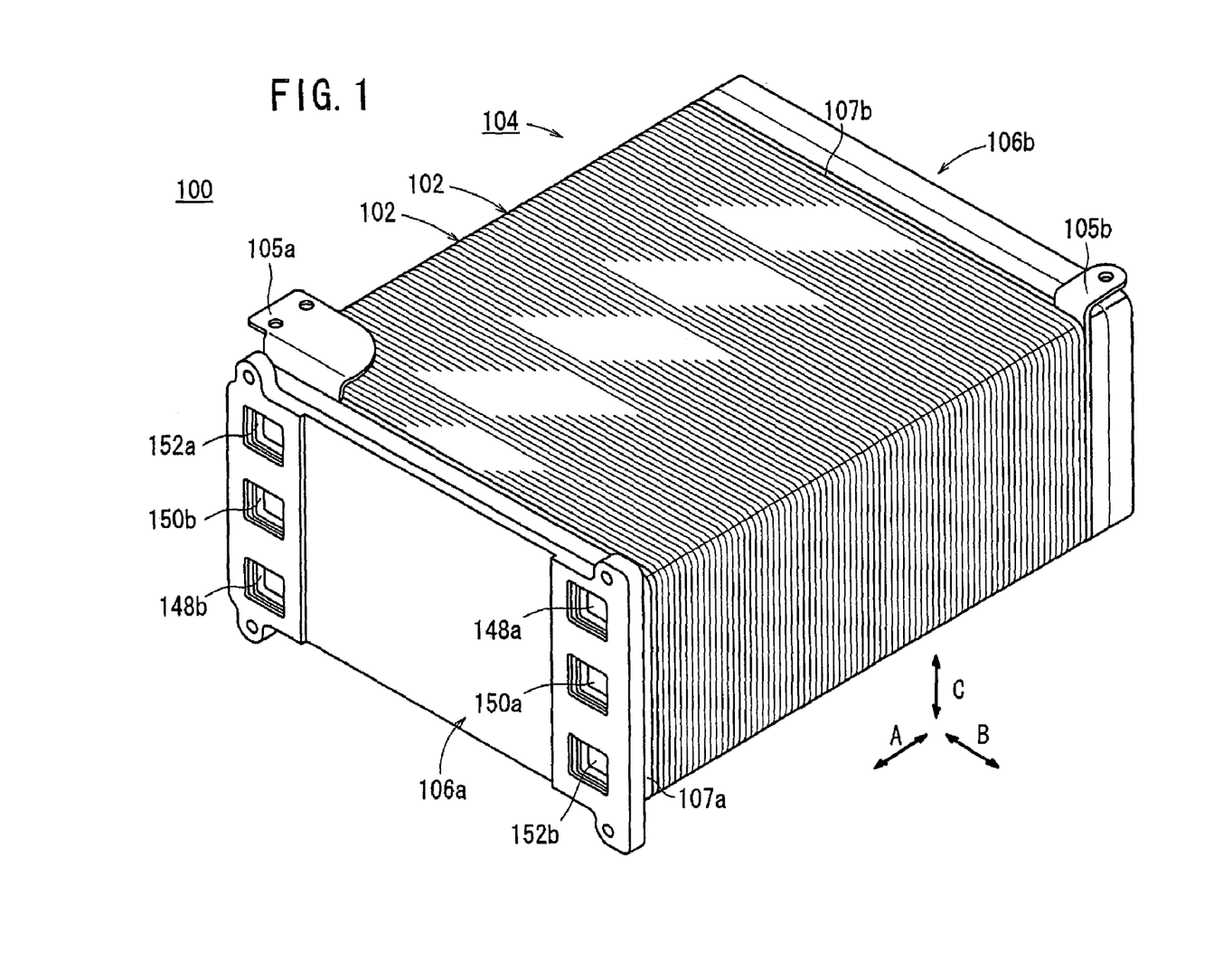
FIG. 1 is a schematic perspective view showing a fuel cell stack formed by stacking fuel cells according to an embodiment of the present invention.
Figure 2:
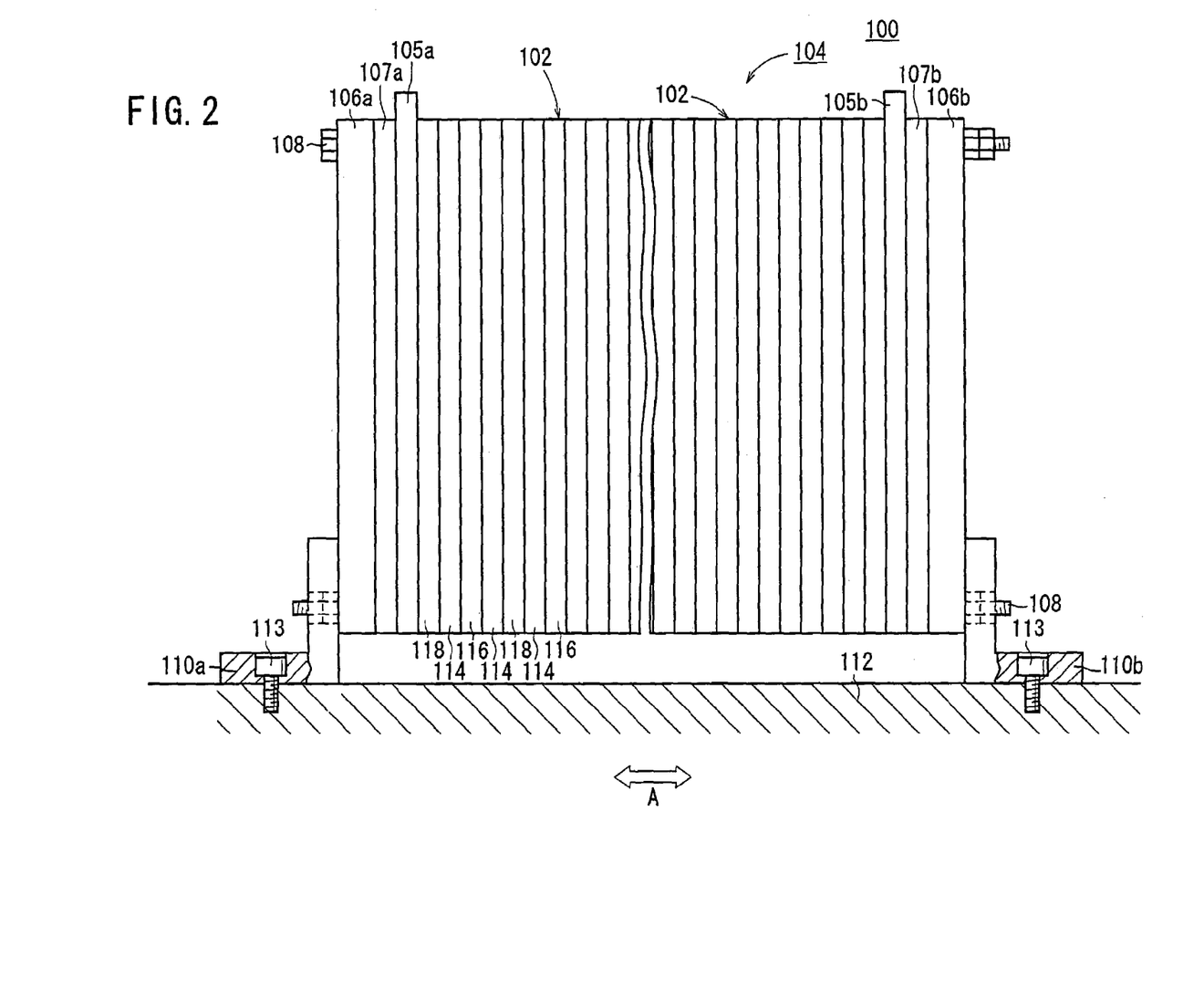
FIG. 2 is a cross sectional side view showing a part of the fuel cell stack.

FIG. 1 is a schematic perspective view showing a fuel cell stack 100 formed by stacking a plurality of fuel cells according to an embodiment of the present invention. FIG. 2 is a cross sectional side view showing a part of the fuel cell stack 100.

The fuel cell stack 100 includes a stack body 104 formed by stacking a plurality of fuel cells (unit cells) in a stacking direction indicated by an arrow A. A positive electrode terminal 105a and a negative electrode terminal 105b are connected to outermost unit cells disposed at opposite ends of the stack body 104 in the stacking direction, respectively. Insulator plates 107a, 107b for prevention of electric leakage are stacked on the outside of the positive electrode terminal 105a, and the negative electrode terminal 105b, respectively. Further, end plates 106a, 106b are stacked on the outside of the insulator plates 107a, 107b, respectively.

As shown in FIG. 2, end plates 106a, 106b are tightened by a tightening mechanism such as a tie rod 108. The fuel cell stack 100 is mounted on a base 112 using mounting brackets 110a, 110b fixed to the end plates 106a, 106b. The mounting brackets 110a, 110b are firmly secured using bolts 113. Therefore, the mounting brackets 110a, 110b do not slide on the base 112.

Figure 3:
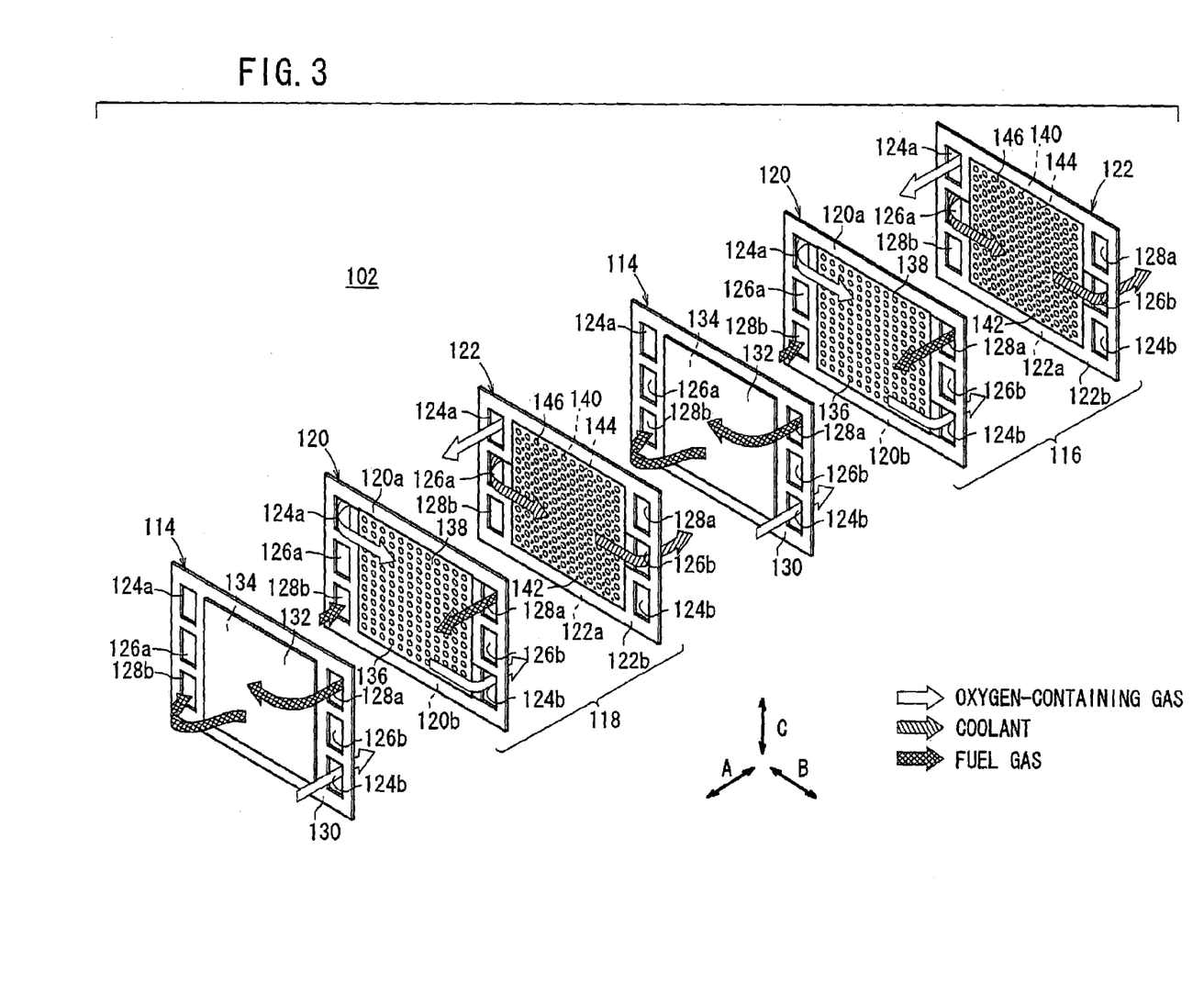
FIG. 3 is an exploded perspective view showing main components of the fuel cell of the fuel cell stack.
Figure 4:
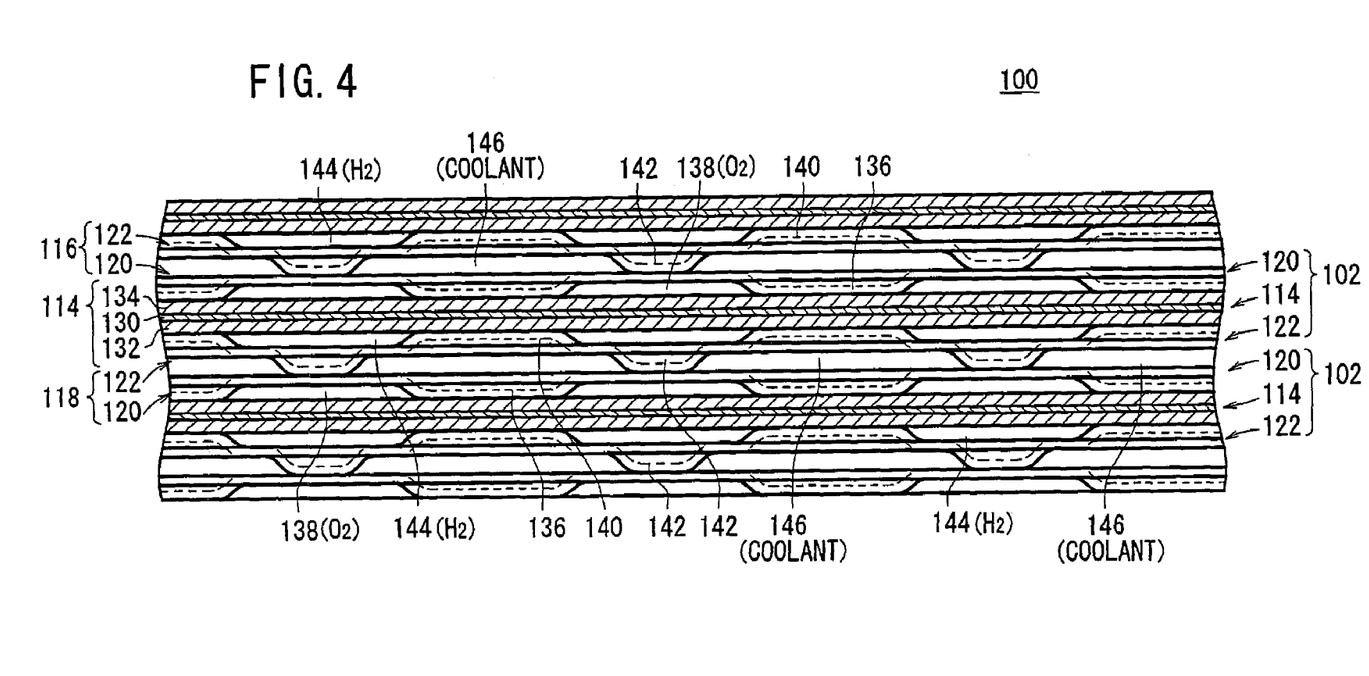
FIG. 4 is a cross sectional view showing main components of the fuel cell.
Figure 5:
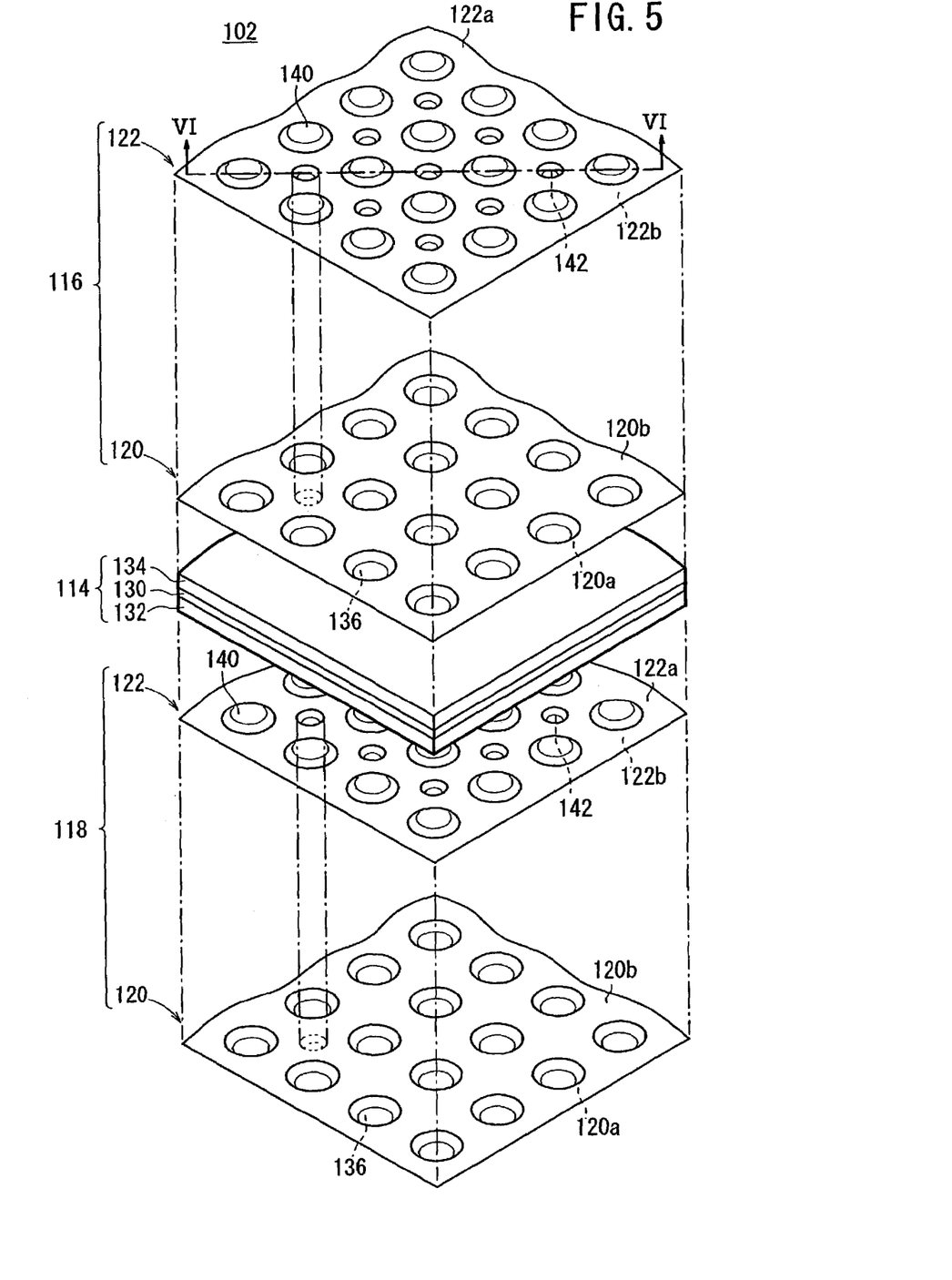
FIG. 5 is an exploded perspective view showing a part of the fuel cell.

As shown in FIGS. 3 and 4, each of the fuel cells 102 includes a membrane electrode assembly (electrolyte electrode assembly) 114 and first and second separators 116, 118. The membrane electrode assembly 114 is interposed between the first and second separators 116, 118. In the embodiment, each of the first and second separators 116, 118 includes a first metal plate 120 and a second metal plate 122. Alternatively, one of the separators comprises the first metal plate 120 and the second metal plate 122, and the other separator comprises a single metal plate only.

As shown in FIG. 3, at an end of the membrane electrode assembly 114 and the first and second separators 116, 118 in the longitudinal direction indicated by an arrow B, an oxygen-containing gas supply passage 124a for supplying an oxygen-containing gas, a coolant supply passage 126a for supplying a coolant, and a fuel gas discharge passage 128b for discharging a fuel gas such as a hydrogen-containing gas are formed. The oxygen-containing gas supply passage 124a, the coolant supply passage 126a, and the fuel gas discharge passage 128b extend in the direction indicated by the arrow A.

At the other end of the membrane electrode assembly 114 and the first and second separators 116, 118 in the longitudinal direction, a fuel gas supply passage 128a for supplying the fuel gas, a coolant discharge passage 126b for discharging the coolant, and an oxygen-containing gas discharge passage 124b for discharging the oxygen-containing gas are formed. The fuel gas supply passage 128a, the coolant discharge passage 126b, and the oxygen-containing gas discharge passage 124b extend in the direction indicated by the arrow A.

The membrane electrode assembly 114 comprises an anode 132, a cathode 134, and an ion exchange membrane 130 of a solid electrolyte interposed between the anode 132 and the cathode 134. The ion exchange membrane 130 is formed by impregnating a thin membrane of perfluorosulfonic acid with water, for example.

Each of the anode 132 and cathode 134 has a gas diffusion layer such as a carbon paper, and an electrode catalyst layer of platinum alloy supported on carbon particles. The carbon particles are deposited uniformly on the surface of the gas diffusion layer. The electrode catalyst layer of the anode 132, and the electrode catalyst layer of the cathode 134 are fixed to both surfaces of the ion exchange membrane 130, respectively.

As shown in FIGS. 3 through 6, the first metal plate 120 has first embossed protrusions 136 protruding from a surface 120a facing a first membrane electrode assembly 114. The first embossed protrusions 136 contact the cathode 134 of the membrane electrode assembly 114. Therefore, an oxygen-containing gas flow passage (reactant gas flow passage) is formed between the first metal plate 120 and the cathode 134. The oxygen-containing gas flow passage 138 is connected to the oxygen-containing gas supply passage 124a and the oxygen-containing gas discharge passage 124b.

The second metal plate 122 has second embossed protrusions 140 protruding from a surface 122a facing a second membrane electrode assembly 114. Further, the second metal plate 122 has third embossed protrusions protruding from a surface 122b facing the first metal plate 120.

As shown in FIGS. 4 thorough 6, the second embossed protrusions 140 are in alignment with the first protrusions 136 of the first metal plate 120. The first protrusions 136 and the second protrusions 140 protrude in opposite directions. The second embossed protrusions 140 contact the anode 132 of the membrane electrode assembly 114. Therefore, a fuel gas flow passage (reactant gas flow passage) 144 is formed between the second metal plate 122 and the anode 132 (see FIGS. 4 and 6). The fuel gas flow passage 144 is connected to the fuel gas supply passage 128a and the fuel gas discharge passage 128b (see FIG. 3).

Figure 6:
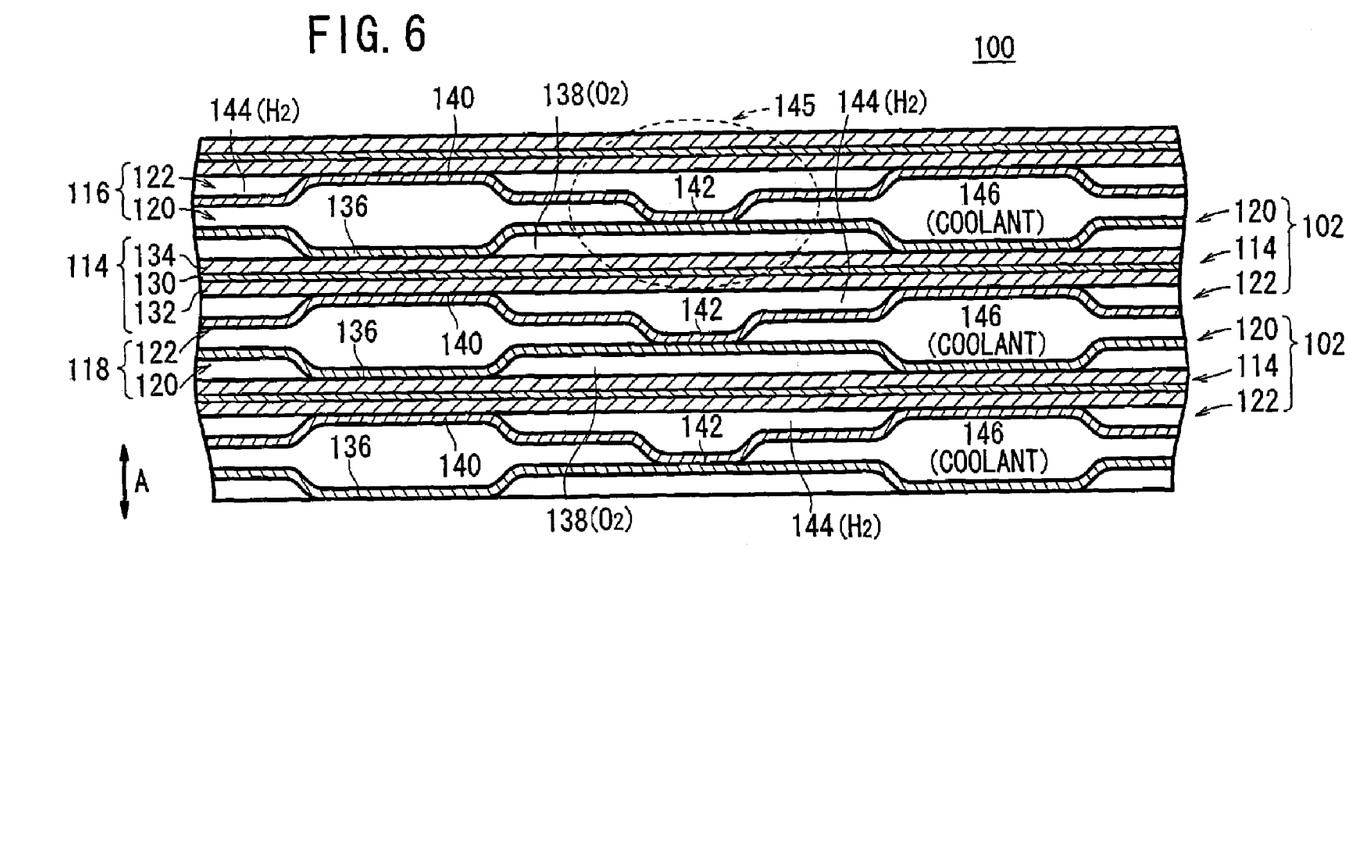
FIG. 6 is a cross sectional view taken along a line VI—VI in FIG. 5.

The second metal plate 122 has third embossed protrusions 142 in contact with the surface 120b of the first metal plate 120 (see FIG. 6). Each of the third embossed protrusions is positioned at a center of four second embossed protrusions 140 (see FIG. 5). The first metal plate 120 has flat part which is spaced from the membrane electrode assembly 114 by the first embossed protrusions 136, and the second metal plate 122 has flat part which is spaced from the membrane electrode assembly 114 by the second embossed protrusion 140. The flat part of the first metal plate 120, the flat part of the second metal plate 122, and the third embossed protrusions 142 form a spring mechanism 145 (see FIG. 6).

A coolant flow passage 146 may be formed between the first metal plate 120 and the second metal plate 122 if necessary. The coolant flow passage 146 is connected to the coolant supply passage 126a and the coolant discharge passage 126b (see FIG. 3).

As shown in FIG. 1, at an end of the end plate 106a in the longitudinal direction indicated by the arrow B, an oxygen-containing gas supply port 148a, a coolant supply port 150a, and a fuel gas discharge port 152b are formed. The oxygen-containing gas supply port 148a is connected to the oxygen-containing gas supply passage 124a. The coolant supply port 150a is connected to the coolant supply passage 126a. The fuel gas discharge port 152b is connected to the fuel gas discharge passage 128b. At the other end of the end plate 106a in the longitudinal direction indicated by the arrow B, a fuel gas supply port 152a, a coolant discharge port 150b, and an oxygen-containing gas discharge port 148b are formed. The fuel gas supply port 152a is connected to the fuel gas supply passage 128a. The coolant discharge port 150b is connected to the coolant discharge passage 126b. The oxygen-containing gas discharge port 148b is connected to the oxygen-containing gas discharge passage 124b.

The operation of the fuel cell stack 100 will be described below.

In operating the fuel cell stack 100, an oxygen-containing gas is supplied to the oxygen-containing gas supply port 148a of the end plate 106a, and a fuel gas such as a hydrogen-containing gas is supplied to the fuel gas supply port 152a. Further, a coolant such as pure water, an ethylene glycol or an oil is supplied to the coolant supply port 150a. From the oxygen-containing gas supply port 148a, the fuel gas supply port 152a, and the coolant supply port 150a, the oxygen-containing gas, the fuel gas, and the coolant are supplied in series in the direction indicated by the arrow A to each of the fuel cells 102 stacked together in the direction indicated by the arrow A to form the fuel cell stack 100.

As shown in FIG. 3, the oxygen-containing gas flows into the oxygen-containing gas flow passage 138 formed on the first metal plate 120 of the first separator 116 from the oxygen-containing gas supply passage 124a, and flows along the cathode 134 of the membrane electrode assembly 114 to induce an electrochemical reaction at the cathode 134. The fuel gas flows into the fuel gas flow passage 144 formed on the second metal plate 122 of the second separator 118 from the fuel gas supply passage 128a, and flows along the anode 132 of the membrane electrode assembly 114 to induce an electrochemical reaction at the anode 132.

In the membrane electrode assembly 114, the oxygen-containing gas supplied to the cathode 134, and the fuel gas supplied to the anode 132 are consumed in the electrochemical reactions at catalyst layers of the cathode 134 and the anode 132 for generating electricity.

After the oxygen-containing gas is consumed at the cathode 134, the oxygen-containing gas flows into the oxygen-containing gas discharge passage 124b, and flows in the direction indicated by the arrow A. Then, the oxygen-containing gas is discharged from the oxygen-containing gas discharge port 148b of the end plate 106a. Similarly, after the fuel gas is consumed at the anode 132, the fuel gas flows into the fuel gas discharge passage 128b, and flows in the direction indicated by the arrow A. Then, the fuel gas is discharged from the fuel gas discharge port 152b of the end plate 106a.

The coolant supplied to the coolant supply passage 126a flows into the coolant flow passage 146 formed between the first metal plate 120 and the second metal plate 122. After the coolant is used for cooling the membrane electrode assembly 114, the coolant flows through the coolant discharge passage 126, and the coolant is discharged from the coolant discharge port 150b of the end plate 106a.

In the present embodiment, the first and separators 116, 118 include the first and second metal plates 120, 122. Each of the fuel cells 102 is made up of the first and second metal plates 120, 122, and the membrane electrode assembly 114. The coolant flow passage 146 is formed between the first metal plate 120 and the second metal plate 122. The first embossed protrusions 136 of the first metal plate 120 are in contact with one surface of the membrane electrode assembly 114 and the second embossed protrusions 140 of the second metal plate 122 are in contact with the other surface of the membrane electrode assembly 114. Therefore, the oxygen-containing gas flow passage 138 is formed between the first metal plate 120 and the membrane electrode assembly 114, and the fuel gas flow passage 144 is formed between the second metal plate 122 and the membrane electrode assembly 114.

The fuel cell 102 is formed by simply interposing the membrane electrode assembly 114 between the first metal plate 120 and the second metal plate 122. The fuel cell 102 is compact and simple.

The third embossed protrusions 142 are in contact with the surface 120b of the first metal plate 120. The spring mechanism 145 is formed by the flat part of the first metal plate 120, the flat part of the second metal plate 122, and the third protrusions 142 (see FIG. 6). Therefore, even if the fuel cell stack 100 is thermally expanded in the stacking direction indicated by the arrow A, the spring mechanism 145 resiliently deforms to keep the tightening force for tightening the entire fuel cell stack 100.

Therefore, for example, belleville springs are not used at an end of the fuel cell stack 100 in the stacking direction. Further, it is not necessary to use any dedicated leaf springs or the like in the fuel cell stack 100. Thus, the overall fuel cell stack 100 is compact and light. In particular, the dimension of the fuel cell stack 100 in the stacking direction is greatly reduced.

The arrangement of the first through third embossed protrusions 136, 140, 142 of the first metal plate 120 and the second metal plate 122 is not limited to the embodiment described above, and various modifications can be made.

According to the fuel cell of the present invention, each of the first metal plate and the second metal plate has flat portion spaced from the electrolyte electrode assembly. The third embossed protrusions of the second metal plate are in contact with the flat part of the first metal plate. Therefore, the spring mechanism is formed by the third protrusions and the flat part of the first metal plate and the flat part of the second metal plate.

Therefore, it is not necessary to use any belleville springs at an end of the fuel cell stack in the stacking direction. Further, it is not necessary to use any dedicated leaf springs or the like in the fuel cell stack. Since the metal plates are used as the separators, the separators are thin in contrast to the conventional separators made of carbon. Therefore, the overall fuel cell is compact and light.

While the invention has been particularly shown and described with reference to preferred embodiments, it will be understood that variations and modifications can be effected thereto by those skilled in the art without departing from the spirit and scope of the invention as defined by the appended claims.

What is claimed is:

1. A fuel cell comprising:
   an electrolyte electrode assembly including an anode, a cathode, and an electrolyte interposed between said anode and said cathode; and
   a pair of separators, said electrolyte electrode assembly being interposed between said separators, wherein
   at least one of said separators includes at least a first metal plate and a second metal plate;
   said first metal plate has a flat part and a plurality of first protrusions protruding toward said electrolyte electrode assembly to form a first reactant gas flow passage between said first metal plate and said electrolyte electrode assembly, said first protrusions are spaced from each other by the flat part of said first metal plate, wherein said first protrusions protrude from the flat part of said first metal plate;
   said second metal plate has a plurality of second protrusions in alignment with said first protrusions, said second protrusions protruding oppositely to said first protrusions to form a second reactant gas flow passage between said second metal plate and another electrolyte electrode assembly of another fuel cell; and
   said second metal plate has a flat part and a plurality of third protrusions that are spaced from said second protrusions by the flat part of said second metal plate, said third protrusions being in direct contact with the flat part of said first metal plate and protruding oppositely to said second protrusions, wherein said second and third protrusions protrude from the flat part of said second metal plate; and
   said flat part of said first metal plate and said flat part of said second metal plate are spaced from said electrolyte electrode assembly, and function as a spring mechanism with said third protrusions interposed therebetween.

2. A fuel cell according to claim 1, wherein said first reactant gas flow passage is an oxygen-containing gas flow passage for supplying an oxygen-containing gas to said cathode;
   said second reactant gas flow passage is a fuel gas flow passage for supplying a fuel gas to said anode; and
   said third protrusions of said second metal plate protrudes from said fuel gas flow passage toward said first metal plate.

3. A fuel cell according to claim 1, further comprising a coolant flow passage formed between said first metal plate and said second metal plate.

4. A fuel cell according to claim 1, wherein said first, second and third protrusions are embossed protrusions.

5. A fuel cell according to claim 1, wherein a plurality of said fuel cells are stacked together to form a fuel cell stack; further comprising first and second brackets attached to opposite ends of said fuel cell stack in a stacking direction; and said first and said second brackets are fixedly mounted on a base.

6. A fuel cell according to claim 1, wherein said electrolyte of said electrolyte electrode assembly is a solid polymer electrolyte membrane interposed between said anode and said cathode.

7. A fuel cell according to claim 1, wherein each of said plurality of first, second, and third protrusions has a frustum shape.

* * * * *